Jan. 14, 1936.        N. NIELSEN        2,027,697
HOMOGENIZING PULVERULENT MATERIALS
Filed Dec. 5, 1933
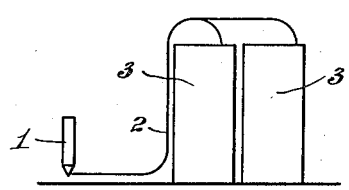
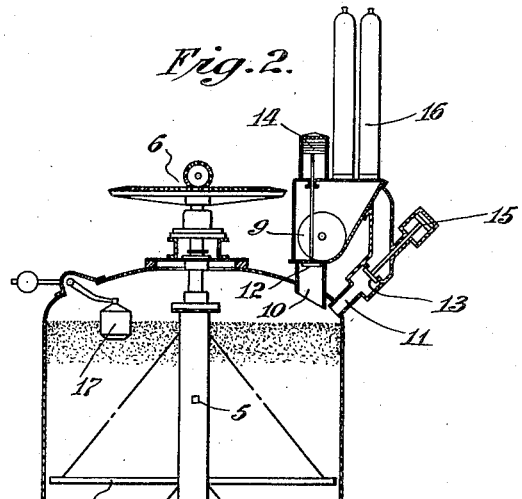
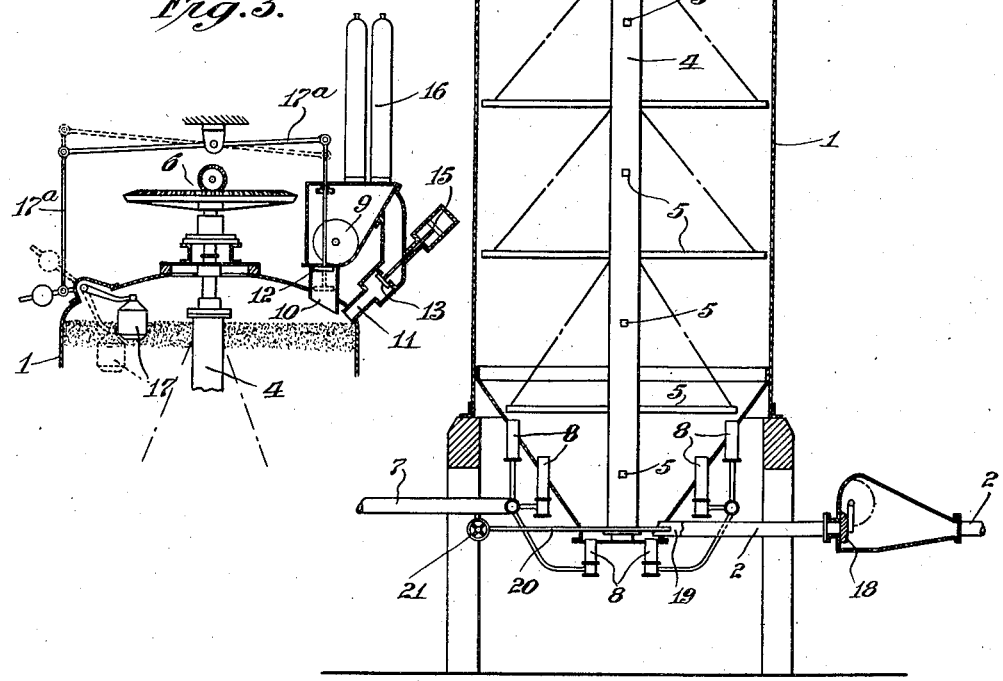
INVENTOR
Niels Nielsen
BY
Redding, Greeley, O'Shea & Campbell
ATTORNEYS Patented Jan. 14, 1936

2,027,697

UNITED STATES PATENT OFFICE 2,027,697

HOMOGENIZING PULVERULENT MATERIALS

Niels Nielsen, Frederiksberg, near Copenhagen, Denmark, assignor to F. L. Smidth & Co., New York, N. Y., a corporation of New Jersey Application December 5, 1933, Serial No. 701,008
In Great Britain December 8, 1932

1 Claim. (Cl. 302—53)

In Letters Patent of the United States No. 1,798,423, dated March 31, 1931, issued to the assignee herein upon the application of Mikael Vogel-Jorgensen, there is shown and described an apparatus in which, for the purpose of accomplishing a homogeneous mixture of pulverulent material, such as cement raw meal, the pulverulent material is mixed with air in order that it may assume the characteristics of a freely movable fluid, or become fluent, and at the same time is subjected to a mechanical stirring operation. In that apparatus, as shown in said Letters Patent, the fluent material is transferred from the homogenizing bin to a storage bin by a screw conveyor. Such conveyors are expensive in construction and installation, and in some cases in order to avoid such expense the homogenizing bins have been placed above the storage bins so that the fluent material may flow by gravity into the storage bins, but because the homogenizing bins are large and heavy and because of limitations of space this arrangement is not always feasible. In the development of the present invention it has been sought to avoid the necessity of providing screw conveyors or other mechanical conveyors and to avoid the necessity of placing the homogenizing bins above the storage bins and to make it possible to provide for the transport of the fluent material from the homogenizing bin to the storage bin or other place of deposit of the material by pneumatic means, utilizing for the purpose of transporting or conveying material air supplied from the homogenizing bin so that there shall be no risk of clogging of the material as might happen if the material were transferred from the homogenizing bin to a closed container and then from the closed container through a pipe line by air under pressure. It may be desirable, depending upon the distance to which the material is to be conveyed, to increase the air pressure at the time of discharging and conveying the material over that at which the material is aerated or rendered fluent. The invention will be more fully explained hereinafter with reference to the accompanying drawing, in which:

Figure 1 is a diagrammatic view in outline illustrating the possible relation of a homogenizing bin to the storage bins.

Figure 2 is a view in vertical, sectional elevation, partly in outline, of a homogenizing bin with its associated parts.

Figure 3 is a detail view of a modification including an automatic controlling device to be referred to.

In the arrangement shown in Figure 1 a homogenizing bin 1 is shown as connected by a pipe line 2 with storage bins 3 into which the fluent material is to be delivered from the homogenizing bin after the material has been thoroughly homogenized.

The bin 1 is shown as provided with a vertical rotary shaft 4 having radial stirring arms 5 and driven through gearing 6 from a suitable prime mover. Air under pressure may be introduced into the bin and into the material contained therein by a pipe 7 and nozzles 8, such air serving, as is well understood, to eliminate or reduce friction between the particles of materials and so permit thorough mechanical stirring to be effected. The material to be homogenized may be supplied to the bin 1 by a feed worm 9 through a charging opening 10, the air which separates from the material during the homogenizing being allowed to escape from the bin through an outlet 11. Valves 12 and 13, actuated by pistons 14 and 15 respectively in corresponding cylinders, regulate the openings 10 and 11 and provide for the closing thereof after the completion of the homogenizing and during the discharge of the fluent material from the bin. The pistons 14 and 15 may be actuated by air under pressure under the control of a timing device. The air which escapes from the bin may pass to a dust filter 16, which may be of any suitable construction, and may then pass into the open air.

The level of the material in the bin 1 may be controlled by a float 17 which may control the feed of material into the bin, as illustrated for example in Figure 3, in which the float 17 is shown as connected by linkage 17a with the stem of the valve 12. The material, when thoroughly homogenized in the bin 1, is discharged therefrom through the pipe 2 into the storage bin, a valve, as at 18, being provided to prevent the discharge of the material until it has been thoroughly homogenized. At the time of discharge of the material from the bin 1 the valves 12 and 13 are closed and the pressure under which air is admitted through the pipe 7 may be increased if found to be necessary. The flow of material from the bin 1 may be promoted by the action of an air ejector 19 supplied with air through a pipe 20 under control of a valve 21, which is preferably kept closed until the air pressure in the pipe line 7 reaches a predetermined degree. If desired this valve might be kept closed by a spring and opened automatically against the pressure of the spring when the air pressure in the pipe line has attained the desired degree.

If at any time in the operation of the apparatus the material in the bin should become insufficiently fluent, as by reason of an insufficient supply of homogenizing air, and should accumulate as a compact mass in the bin, the bin may be emptied as by the supply of additional air under pressure both in the bottom of the bin near the outlet and above the material in the bin, suitable air nozzles and connections being provided for the purpose.

I claim as my invention:

The combination of a bin for the homogenization of pulverulent material, means to introduce air under pressure into the bin at its lower end to render the material fluent, means for agitating and homogenizing the whole mass of material in the bin, valve controlled means for the delivery of material to the bin to be homogenized, valve controlled means to permit the escape from the bin of air separated from the material during the homogenization process, pressure actuated means for closing both said valve controlled means during the discharge of the fluent material from the bin, a valve controlled outlet for the material, means for regulating the air pressure in the bin to effect the discharge of the material from the bin, a float within the bin, and operative connections between the float and said valve controlled means for the delivery of material.

NIELS NIELSEN.